(12) United States Patent
Hethuin et al.

(10) Patent No.: US 8,693,387 B2
(45) Date of Patent: Apr. 8, 2014

(54) TRANSCEIVER STATION FOR FORMING A TELECOMMUNICATIONS NETWORK NODE AND ASSOCIATED TELECOMMUNICATIONS METHOD

(75) Inventors: Serge Hethuin, Courbevoie (FR); Isabelle Bucaille, Levallois Perret (FR); Cyril Lantz, Paris (FR)

(73) Assignee: Thales, Neuilly sur Seine (FR)

( * ) Notice: Subject to any disclaimer, the term of this patent is extended or adjusted under 35 U.S.C. 154(b) by 81 days.

(21) Appl. No.: 13/446,828

(22) Filed: Apr. 13, 2012

(65) Prior Publication Data

US 2013/0064233 A1 Mar. 14, 2013

(30) Foreign Application Priority Data

Apr. 14, 2011 (FR) ...................................... 11 01170

(51) Int. Cl.
*H04B 7/14* (2006.01)
*H04B 7/212* (2006.01)

(52) U.S. Cl.
USPC ............................ 370/315; 370/323; 370/338

(58) Field of Classification Search
USPC ......................................... 370/315, 323, 338
See application file for complete search history.

(56) References Cited

U.S. PATENT DOCUMENTS

| 6,055,427 | A   | * | 4/2000 | Ojaniemi ....................... 455/436 |
| 6,760,594 | B1  | * | 7/2004 | Murasawa et al. ............ 455/512 |
| 8,139,685 | B2  | * | 3/2012 | Simic et al. .................... 375/324 |
| 2002/0077151 | A1 |   | 6/2002 | Matthews et al. |
| 2009/0110033 | A1 | * | 4/2009 | Shattil ........................... 375/141 |
| 2010/0142416 | A1 | * | 6/2010 | Kim ................................ 370/281 |
| 2011/0051656 | A1 |   | 3/2011 | Hethuin et al. |
| 2011/0069689 | A1 | * | 3/2011 | Grandhi et al. ............... 370/338 |

FOREIGN PATENT DOCUMENTS

| FR | 2 929 781 A1 | 10/2009 |
| WO | 2009150245 A1 | 6/2009 |

\* cited by examiner

*Primary Examiner* — Kenny Lin
(74) *Attorney, Agent, or Firm* — Davidson, Davidson & Kappel, LLC

(57) ABSTRACT

A transceiver station is provided for forming a telecommunications network node. The station includes at least two transceiver radio modules and a control module. Each transceiver module is adapted to operate alternately as a subscriber station and as a base station, as a function of commands from the control module. The control module is adapted to determine a modification of the state of the network and to dynamically control at least one change in the operation of at least one transceiver module, from subscriber station to base station or vice versa, as a function of at least the determined modification. The control module is adapted so that the number of subscriber stations connected to a base station is at most equal to 1.

14 Claims, 14 Drawing Sheets

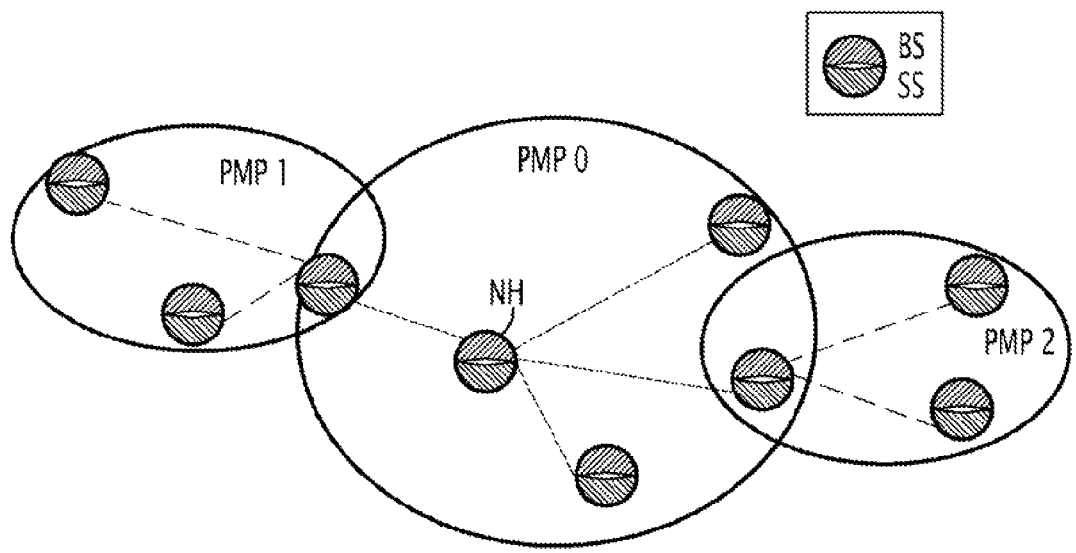
FIG.1 - Prior art
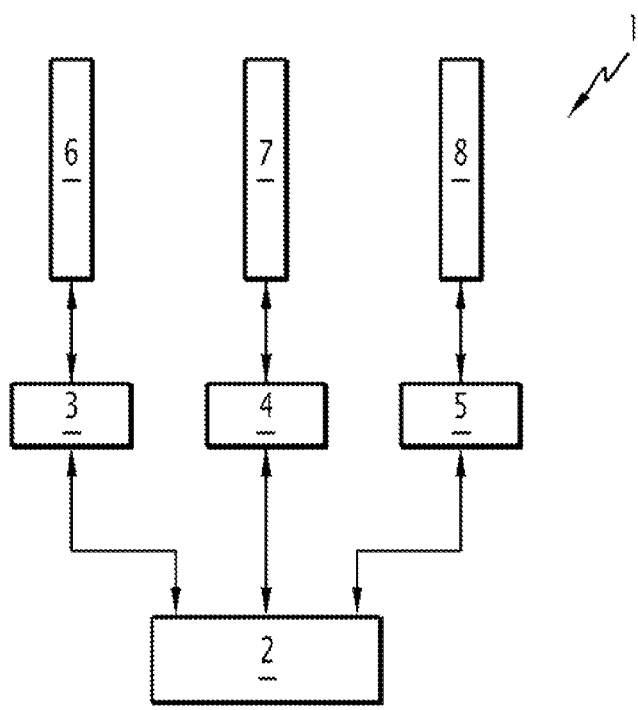
FIG.2

TRANSCEIVER STATION FOR FORMING A TELECOMMUNICATIONS NETWORK NODE AND ASSOCIATED TELECOMMUNICATIONS METHOD

This claims the benefit of French Patent Application No. 11 01170, filed on Apr. 14, 2011 and hereby incorporated by reference herein.

The present invention relates to a transceiver station for forming a telecommunications network node for forming a telecommunications network node.

More specifically, the present invention relates to the field of ad hoc networks, which lack fixed infrastructure and in which stations equipped with radio transmission and/or receiver means and adequate protocols form the nodes of the network.

BACKGROUND OF THE INVENTION

The ad hoc mode of radio networks is traditionally based on two distinct approaches. The first, called "flat approach," consists of considering that all nodes are of equal importance at all times and requires a significant signal exchange between the nodes, part of the bandwidth therefore being dedicated to that purpose. Furthermore, it is difficult to synchronize the network globally, to optimize the use of radio resources without a network coordinator (TDMA protocol difficult to establish in a "flat" network) and the load of the network becomes significant in case of link losses.

The second approach consists of structuring an ad hoc network as a stack of clusters, each cluster for example being a cell of the Point-to-MultiPoint (PMP) type as in WiMAX (IEEE 802.16). The resulting network is typically based on a tree structure as shown in FIG. 1. The central node, called Network Head (NH), at the top of the structure, i.e. which is not attached to any higher-level station, is responsible for coordinating the network. The nodes are connected at most to a single station of a higher hierarchical level. In document FR 0801869, published as FR 2 929 781, hereby incorporated by reference herein, a node of such a network comprises two radios per node, each radio in turn being able to be base station (BS) for a lower-order cluster or subscriber station (SS) for the higher-order cluster. This approach already makes it possible to substantially limit modifications to be made to the MAC (Medium Access Control) layer, and combines efficiency and cost reduction.

WO 2009/150245, hereby incorporated by reference herein, purportedly discloses sub channel generation for a wireless mesh network. A method, apparatus and computer program divide an available bandwidth into a plurality of frequency bands or channels, divide each of the plurality of frequency bands or channels into a plurality of orthogonal sub-carriers, organize the sub-carriers into a plurality of sub-channels, and assign at least some of the generated sub-channels to at least one corresponding radio link between parent and child nodes of a mesh network.

U.S. Publication No. 2002/0077151, hereby incorporated by reference herein, purportedly discloses a nanoCell base station for providing radio connectivity among one or more mobile stations, one or more base transceiver stations or one or more other nanoCell base stations.

SUMMARY OF THE INVENTION

It does, however, have a certain number of drawbacks.
First, the use of PMP creates sharing of the available bandwidth between all of the subscribers of a same cluster.

Furthermore, in the event smart antennas are used, for example of the fast electronically steerable antenna (FESA) type, the BS station of a node must incorporate a real-time control (RTC) procedure, which increases implementation difficulties, unlike the AFS non-real-time control (cf. Document FR 0805151).

Furthermore, merging networks may be complicated and in the middle term, implementing new radio technologies is greatly compromised.

The present invention provides a transceiver station for forming a telecommunications network node for forming a telecommunications network node, said station comprising at least two transceiver radio modules and a control module and wherein each transceiver module is adapted to operate alternatingly as a subscriber station to establish a connection with a base station of a first other node and as a base station to establish a connection with a subscriber station of a second other node, as a function of commands from the control module, the control module is adapted to determine or receive at least one modification of the state of the network and to dynamically control at least one change in the operation of at least one transceiver module, from subscriber station to base station or vice versa, as a function of at least the determined modification, characterized in that the control module is adapted so that the number of subscriber stations connected to a base station is at most equal to 1.

An object of the present invention may make it possible to create ad hoc networks using Multipoint-to-Point connections (hereafter "MPP network"), to keep the advantages of tree structures (unlike flat structures), improve the end-to-end efficiency of the network while avoiding sharing of the bandwidth by several subscribers, and reinforce the operating independence of the network relative to the radio technologies used, these radios being able to be of the Wi-Fi, WiMAX, or other type.

In preferred embodiments, the transceiver for forming a telecommunications network node according to the invention may also comprise one or more of the following features:
- when the node no longer has any subscriber station (SS) that is not connected, the control module is adapted to control alternating operation as base station and subscriber station of at least one non-connected transceiver of the node;
- said operation alternates as a function of a random time parameter;
- said station making up a node of a first network:
  - a non-connected base station of the node is adapted to insert a parameter indicating a degree of importance of the first network in a frame transmitted by said base station; and/or
  - when, during alternating operation of a transceiver module of the node, said transceiver module then operating as a subscriber station detects a frame from a non-connected base station of another node of a second network separate from the first network, said frame indicating a degree of importance of the second network, the control module of the node of the first network is adapted to:
    - if the degree of importance of the second network is lower than a degree of importance of first network, prohibit the connection between the transceiver module operating as subscriber station of said node and said base station of the other node; and
    - if the degree of importance of the second network is higher than the degree of importance of the first network, authorize the connection between the transceiver module of the node operating as subscriber station and said base station of the other node;

when, during alternating operation of a transceiver module of the node, a connection deemed high-priority is established between a base station of another node and said transceiver module then operating as subscriber station, and the number of subscriber stations connected in the node is greater than or equal to 2, the control module commands said transceiver module to leave the alternating operation and keeps it a subscriber station while it commands the other connected transceiver modules of the node then operating as subscriber stations to transition to base station;

the station connected to a network also comprises a given transceiver module that is adapted to operate only as a non-connected subscriber station, in which when the given transceiver module detects a non-connected base station of a node not connected to the network, then the control module commands that a subscriber station of the transceiver station connect to said base station;

said base station of the node is adapted to indicate its status, connected or not connected, in a frame that it transmits; and the control module is adapted to refuse a connection of the subscriber station of the node with a base station of another node having transmitted a preamble indicating a connected status; and/or the control module is adapted to refuse any connection of said base station of the node with a subscriber station of another node when said base station of the node is already connected;

the control module is adapted to prohibit the connection between the node and another node, when there is already a connection between said node and said other node;

a subscriber station of the node provides a synchronization signal to a base station of the node, said synchronization signal depending on a signal received by said subscriber station and transmitted by the base station of another node that is connected to the subscriber station;

the transceiver station comprises several subscriber stations, is adapted for only one of said subscriber stations of the node to provide a synchronization signal to each base station of the node;

a synchronization signal depending on a signal from GPS is provided to all of the base stations of the transceiver station;

the control module is adapted to command the subscriber station of the node seeking to connect to a base station not to listen to a preamble transmitted by a base station of the node.

According to a second preferred aspect, the present invention may provide a communication method in a telecommunications network comprising transceiver stations forming network nodes, a transceiver station comprising a control module and at least two transceiver radio modules each adapted to operate alternatingly as subscriber station to establish a connection with a base station of a first other node, and as base station to establish a connection with a subscriber station of a second other node, as a function of commands from the control module, according to which, in each transceiver station:

at least one modification of the status of the network is determined, and at least one operating change of at least one transceiver module, from subscriber station to base station or vice versa, is dynamically commanded as a function of at least the determined modification; and said method being characterized in that the number of subscriber stations connected to a base station must be at most equal to 1.

BRIEF DESCRIPTION OF THE DRAWINGS

The invention will be better understood upon reading the following description and examining the accompanying figures. These figures are provided as an illustration, and are in no way limiting of the invention. These figures are the following:

FIG. 1 is a view of a PMP network of the prior art;

FIG. 2 is a view of the transceiver station in one embodiment of the invention;

DETAILED DESCRIPTION

Figure 3:
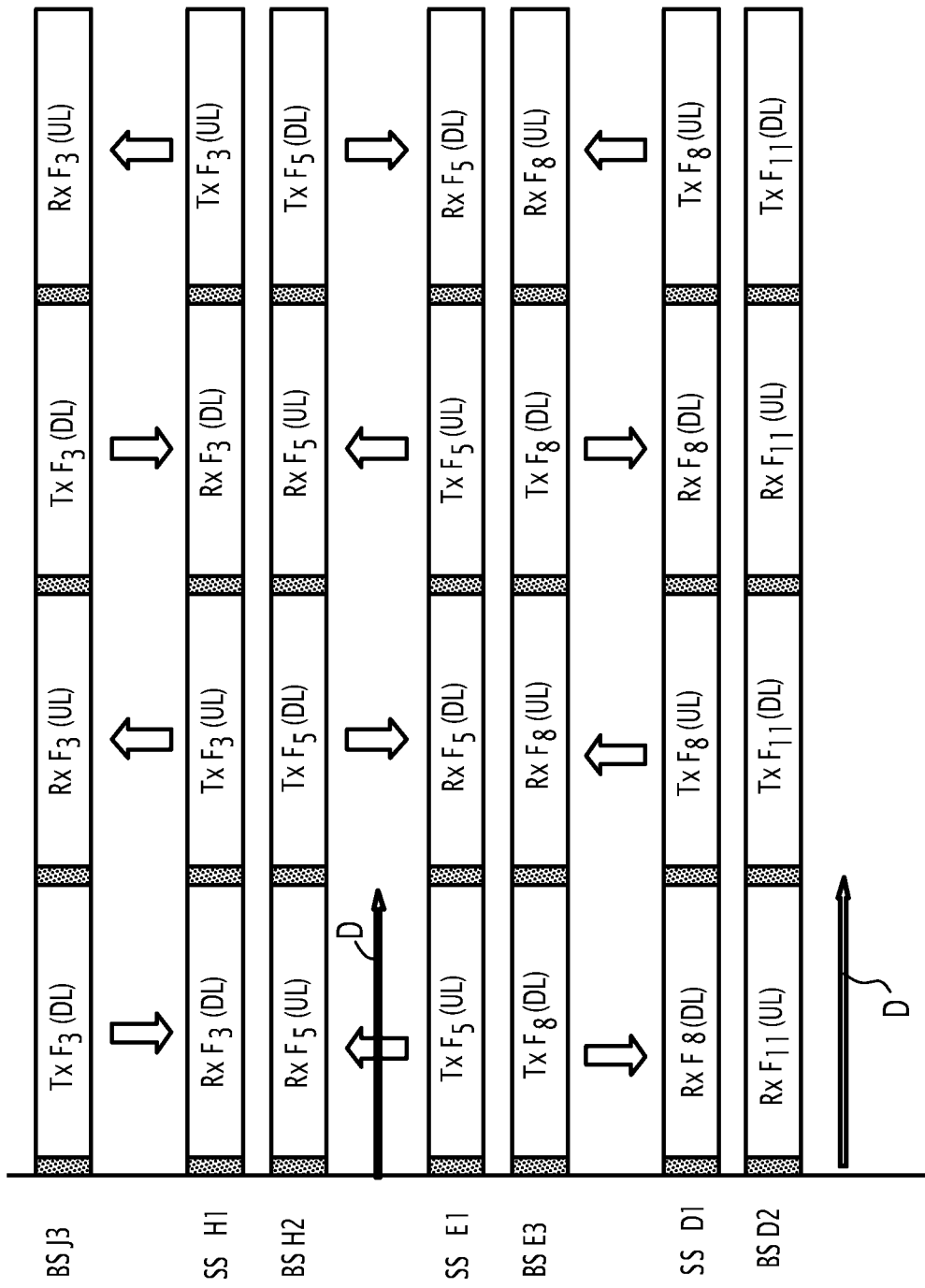
FIG. 3 shows transmissions and receptions of frames within a node in an embodiment the invention.

FIG. 2 diagrammatically illustrates a transceiver station 1 in one embodiment of the invention, intended to constitute a node of an ad hoc radio network. Such transceiver stations will be called "nodes" hereafter.

The node 1 comprises a number N of radio modules, with N greater than or equal to two. In the case illustrated in FIG. 2 and considered in the embodiments described below, the number of radio modules is at least equal to three.

Each of the radio modules 3, 4, 5 is connected on the one hand to a control unit 2 and on the other hand to a radiofrequency transceiver antenna, in the considered case, respectively the antenna 6, 7, 8.

According to the embodiments, the antennas are of various types, for example omnidirectional, sectoral, smart sectoral (S-FESA antennas), smart omnidirectional (FESA antennas).

In certain embodiments, several radio modules are connected to a same antenna, the operation of which is distributed between the nodes.

The control unit 2 is adapted to steer and synchronize, with one another and the rest of the MPP network, the operation of the radio modules, and possibly the antennas, and to pool the functionalities of a node of an MPP network according to the invention, for example the electrical power supply of the radio modules and antennas, a motherboard including the upper layers of the OSI model and in particular allowing the interconnection of the layers 2 and 3.

Each radio module 3, 4, 5 comprises an access layer to the MAC (Medium Access Control) environment, a physical Baseband layer, and a physical radiofrequency layer. These physical layers received the radiofrequency signal coming from the antennas or make it possible to transmit a radiofrequency signal.

Each radio module 3, 4, 5 is adapted to behave, under the steering of the control unit 2, alternatingly as a subscriber station (SS) and as a base station (BS) of the network and to thereby establish connections with the SS or BS of other nodes.

The control unit is adapted to determine at least one modification of the status of the network and to dynamically command at least one operating change of at least one radio module, from subscriber station to base station or vice versa, as a function at least of the determined modification.

Such modifications of the status of the network for example comprise modifications in terms of network load, configuration of the network, relative displacement between the node and at least one neighboring node, relative displacement between the other nodes, connection break, interference, etc.

These operating changes, giving rise to a reconfiguration of the node, and therefore of the network, are done dynamically.

Events determined by the control unit and giving rise to dynamic commands relative to the operation of the radio modules are also described hereafter.

The functionalities characterizing the behavior of a subscriber station and a base station correspond to those described in standard 802.16-2009. However, other types of radio, which may or may not meet other standards, can be used.

In particular, the name base station, subscriber station, respectively, corresponds to a choice that is no way limiting to designate stations of a first type and of a second type, respectively.

These stations could also be named master station and slave station, access point (AP) and client point, or eNodeB and UE, respectively.

What characterizes the stations of the first type, called base stations in this description, is: the registration of subscriber stations through the association mechanism, the synchronization of the subscriber stations owing to the sending of beacons, the sending of control information in the DownLink (DL) portion, the allocation of radio resources for the associated subscriber stations.

What characterizes the stations of the second type, called subscriber stations in this description, is: the detection of beacons sent by the base stations, the association with a base station, the decoding of the control information sent by the base station in the DownLink (DL) portion, the sending of data in the UpLink (UL) portion in the time interval specified by the base station. Typically, the considered states of a BS or SS in the following are: free BS; connected BS; listening SS; connected SS.

A BS in a node periodically transmits a frame with a preamble on a radiofrequency assigned to it (either permanently or temporarily). The preamble provides the SS of other nodes that listen to that radiofrequency with a certain quantity of information: the identifier of the BS, the allocation of time slots to communicate with the BS. A period is also assigned to the SS listening to the frequency and which wish to declare themselves to the BS, or connect to the BS by means of an association procedure establishing a communication link of the network (also called connection hereafter) between these BS and SS.

Furthermore, an SS of a node may listen: it scans the different radio frequencies and listens on each radiofrequency thus scanned to the preambles that may be transmitted by a BS of another node within radio proximity. A free SS seeking to connect can thus request, on the radiofrequency assigned to a BS, an association with that BS so as to establish a communication link of the network with that BS, corresponding to the radiofrequency of the BS.

These communication links, established between two distinct nodes, are used to transmit data from a point A of the network to a point B of the network, as a function of established routing tables making it possible to identify the links to be used.

The establishment of these connections between BS and SS of distinct nodes therefore creates a tree structure. A node is adapted to relay data on an uplink according to the hierarchy of the tree structure (i.e. from an SS of the node to a BS of another node). It is also adapted to relay data over a downlink (i.e. from a BS of the node to an SS of another node).

In this way, a radio module acting as SS in a node is adapted to communicate as transceiver with a station of a higher hierarchical level, while a radio module acting as BS in a node is adapted to communicate as transceiver with a station of a lower hierarchical level.

Rules implemented by a telecommunications method in the embodiments of the invention are described below.

In order to illustrate the interest of these rules, we have incorporated some of these rules into the nodes as malfunctions or drawbacks shown in the absence of those rules arise. However, the rule selected as a function of the operational implementation modes of the invention may of course be implemented in the nodes.

These rules are implemented in the radio nodes under the control of the respective control units, for example using software instructions stored in memory and that are run on a microprocessor.

Depending on the embodiments, the invention is implemented by applying any one of these rules alone or a combination of several of the rules below.

Figure 4:
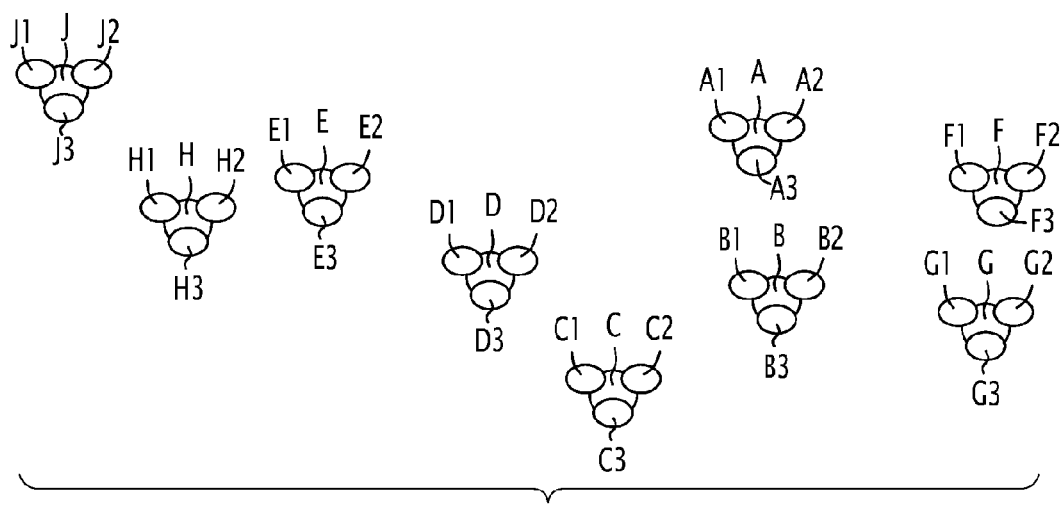
FIG. 4 shows radio nodes for ad hoc networking in one embodiment of the invention.

FIG. 4 shows a set of nodes to be networked, referenced A, B, C, D, E, F, G, H, I, J, of the type of the station 1 shown in FIG. 2.

The considered nodes each have three radio modules in the considered embodiment, but in other embodiments, at least some may have a different number of radio modules.

For any node X, with X assuming the values A to J indicated above, the three radio modules are referenced in all of FIGS. 4 to 15, respectively, X1, X2, X3.

According to one rule (rule no. 1), if the node comprises a number N of radio modules, during an ad hoc networking attempt, the control unit commands one of the radio modules to operate in a dedicated manner as SS, while it commands N−1 other radio modules to act as BS (in other embodiments, only one or some of these radio modules are placed in BS, the others in SS).

Thus, for any node X, with X assuming the values A to J indicated above, the radio module X1 acts as SS, while the modules X2 and X3 act as BS, during the networking.

During this networking attempt, the BS and SS are therefore first in the free state.

Each BS transmits frames comprising its preamble over a radiofrequency that is assigned exclusively to it (either permanently or temporarily).

The SS are in the free state and listening to their radio environment for a connection.

A listening SS seeks the transmission of preambles transmitted by a BS at the beginning of each frame. In one embodiment, it is commanded by the control unit not to listen to the preambles transmitted by the BS that are part of the same node as it.

According to another rule (rule no. 2), if an SS of a node detects a free BS, then the SS is authorized by the control unit of the node to connect to that BS.

A maximum of one connection can be established per BS, under the control of the control units of the nodes.

To that end, for example, each BS of a node is controlled by the control unit of the node so as to no longer accept a connection. Or, a BS is adapted to indicate, in the frames it transmits, for example in the preamble of the frame, its "free" or "busy" state. An SS of another node will or will not connect to the BS as a function of that status indicated by the received frame coming from the BS, under the control of the control unit of the other node.

Similarly, a single connection may be established per SS, under the control of the control unit.

The ad hoc network therefore establishes a network made up of multipoint-to-point connections (MPP).

Figure 5:
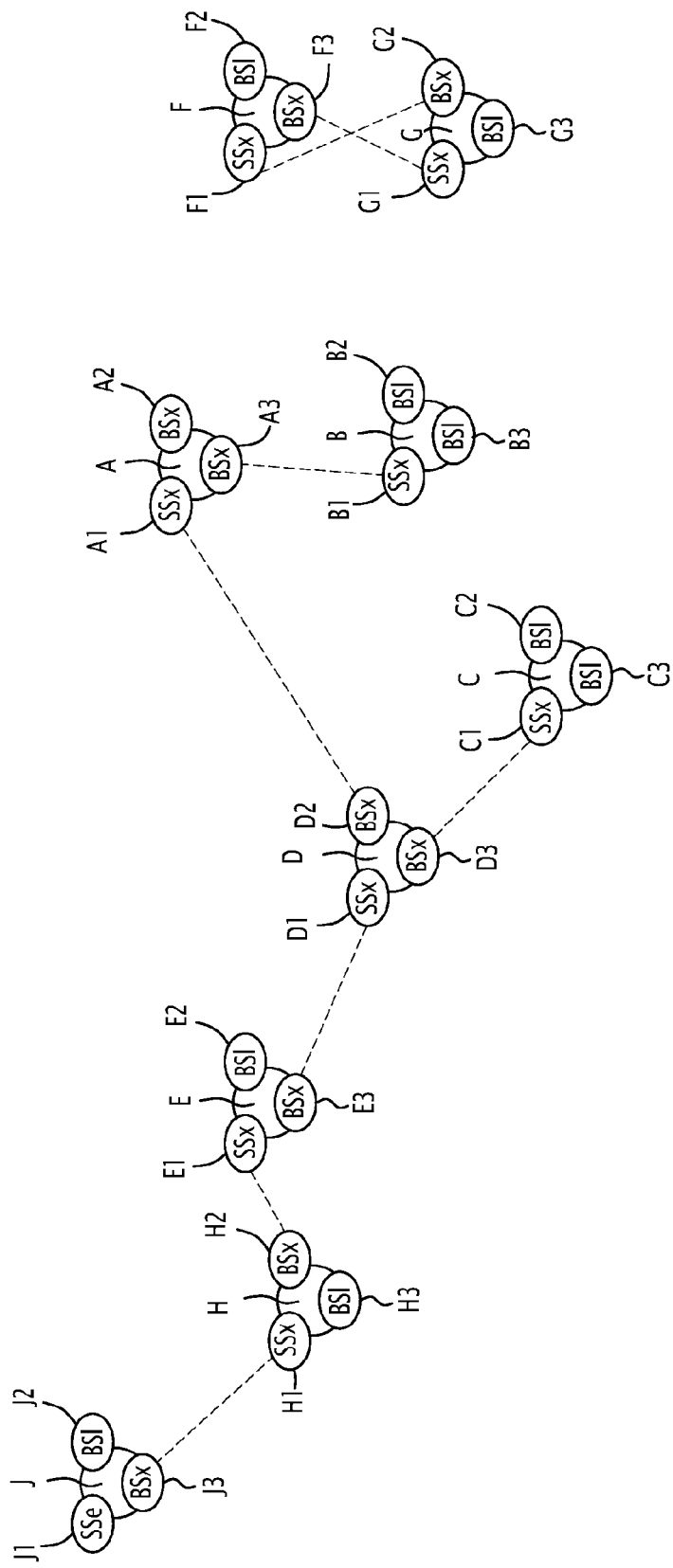
FIG. 5 shows the structure of an ad hoc network in one embodiment of the invention.

According to rules 1 and 2 cited above, an ad hoc network 100 is formed according to the topology shown in FIG. 5, from the nodes shown in FIG. 4.

The segments in broken line show the radio connections between BS and SS of distinct nodes.

The operating mode and the status of each radio module are indicated in FIG. 5 (and in FIGS. 6 to 15), as follows:
"SSx" indicates a connected SS;
"SSe" indicates a free SS, therefore listening;
"BSx" indicates a connected BS;
"BSl" indicates a free BS.

A BS is said to be free when it is not connected (or associated) with any SS. An SS is said to be free when it is not connected (or associated) within a BS. A BS can only be connected with an SS and an SS can only be connected with a BS.

FIG. 3 is a timeline showing the exchanges at modules of some of the nodes shown in FIG. 5: BS J3, SS H1, BS H2, SS E1, BS E3 (NB: this is also incorrect in the drawing), SS D1.

The radio channels assigned to the BS J3, H2, E2 and D2 are respectively the radio channels of distinct frequencies F3, F5, F8 and F11.

The SS H1 connected with the BS J3 therefore transmits and receives on frequency channel F3, while SS E1, respectively SS D1 transmits and receives on frequency channel F5, frequency F8, respectively.

The SS and BS radio modules of the same node transmit at the same time and receive the same time. These transmission Tx and reception Rx frames are synchronized with one another by the control unit of the node. In order to limit interference (even if transmissions take place at the same time and the receptions take place at the same time), the frequency channels assigned to the radio modules are spaced apart (for example by at least one channel).

Arrow D indicates a time shift of one half-frame. Depending on whether a node is of an even or odd rank relative to the Network Head (NH), which in this case is considered node J, the frame made up of a preamble followed by a DownLink (DL) transmission phase, then an UpLink (UL) transmission phase of the BSs of that node, must or must not be shifted by a half-frame relative to an overall synchronization top. In this way, in the example of FIG. 5, the shift of one half-frame must be applied on the BS of nodes H and D.

In the example of FIG. 5, an anomaly concerns nodes F and G. SS F1 tends to connect to BS G2. Likewise, BS F2 is ready to grant the connection of SS G1. This causes a loop incompatible with stable operation.

To avoid the occurrence of this type of anomaly, according to another rule (rule no. 3), two connections may not be established between two same nodes. Thus, a first connection between two nodes being established, the control unit of at least one of the nodes, for example through the local routing table, prohibits any additional connection between those two nodes.

In this way, the G2-F1 connection is for example not authorized. SS F1 then connects, for example, to BS A2, according to the configuration of FIG. 6.

By default, in a first approach, the connections are established as a function of the first node arriving in the network and potentially modified as a function of an optimization technique of the network, as explained later.

In a second approach, the establishment of the connections is conditioned by the structure of a node. In fact, the node is made up of a certain number of resources (N radios with antennas of a given type, etc.) and may not be capable of connecting depending on the type of resource of the node.

Optionally, the establishment of connections is also constrained by the knowledge by each of the nodes of the global routing table of the ad hoc network.

Furthermore, it is necessary to determine the position of the network head (NH). This NH corresponds to the node that is the source of synchronization for all of the others, when there is no global synchronization by GPS. The NH comprises a free SS and at least one connected BS, with a hierarchical rank higher than the other nodes of the network.

According to a rule (rule no. 4), the NH is unique in an ad hoc network. It may change at any time depending on the evolutions of the nodes.

Figure 6:
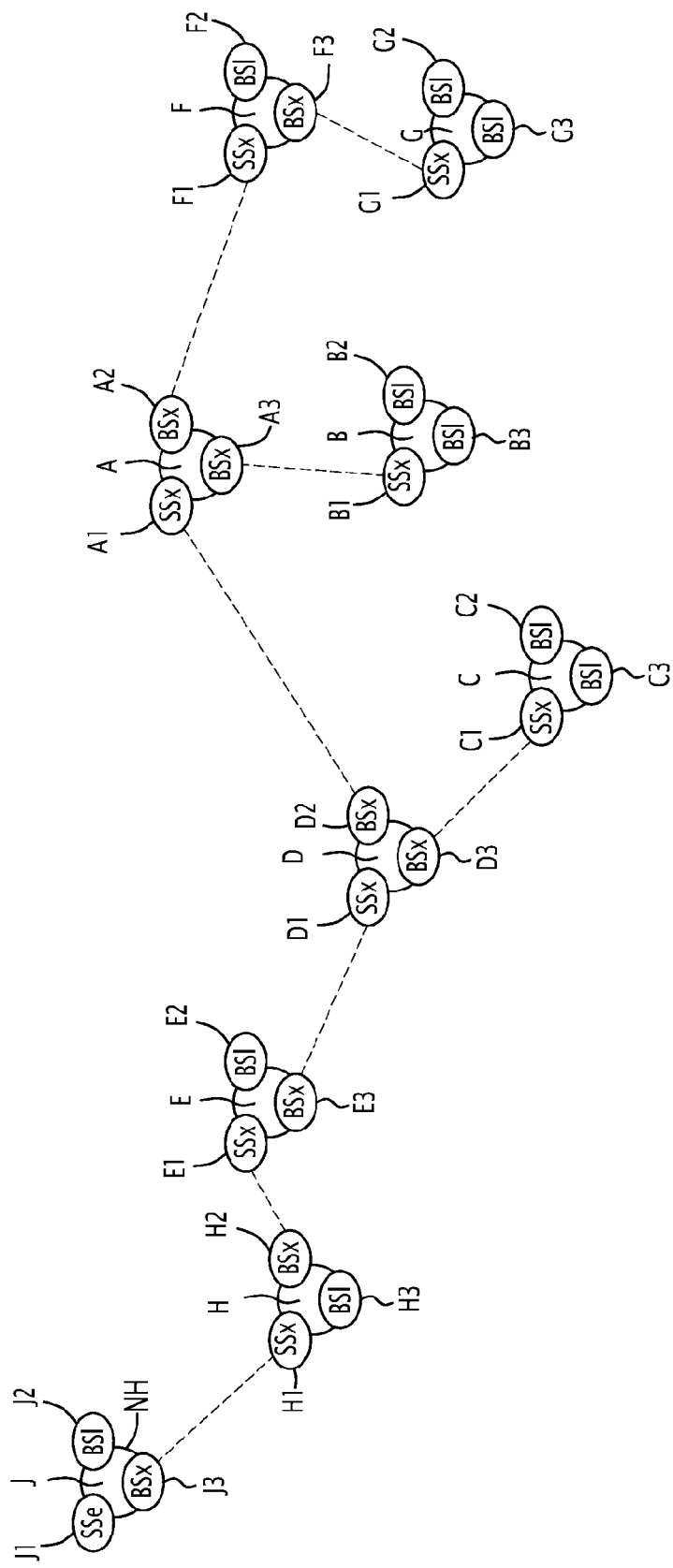
FIG. 6 shows the structure of an ad hoc network in one embodiment of the invention.

Thus, in the configuration of FIG. 6, the NH corresponds to node J.

Starting from the configuration shown in FIG. 6, it is now assumed that the subgroup 100 made up of nodes E, H and J detaches (phenomenon referred to as splitting) from the other nodes following the distancing, for example, of node E relative to node D. When nodes E and D are far enough apart, the radio link can no longer be maintained and the connection between those two nodes is eliminated. The NH being found among nodes E, H and J, the connections within the subgroup are preserved. However, the subgroup 101, made up of nodes A, B, C, D, F and G, must reconfigure so as to cause a new local NH to reappear. Node D is mechanically elected NH of the second subgroup, having the higher-ranking BS of the sub-network 101 thus created.

Figure 7:
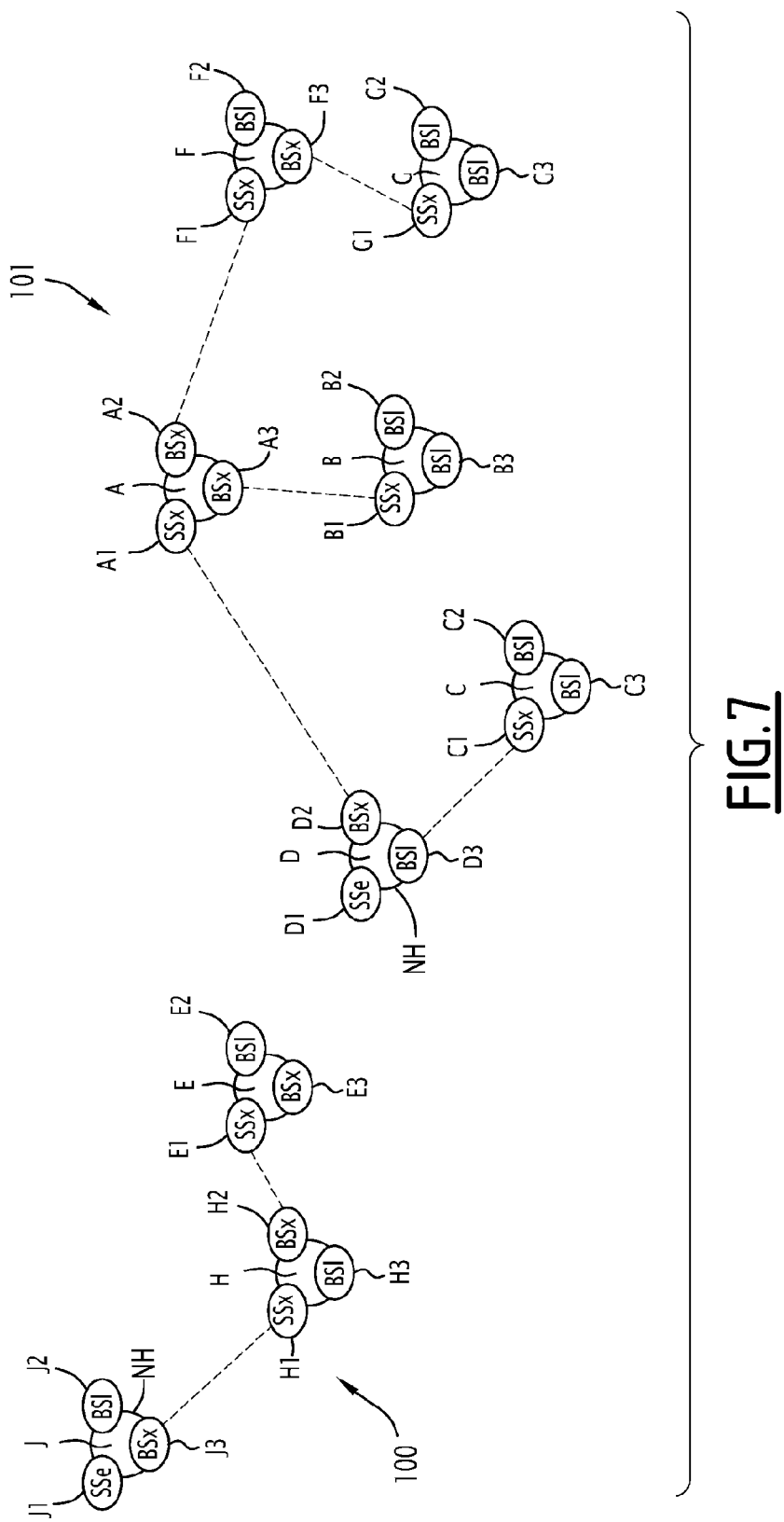
FIG. 7 shows the structure of an ad hoc network in one embodiment of the invention.

The new configuration obtained after the separation of the two sub-groups 100 and 101 is shown in FIG. 7.

Figure 8:
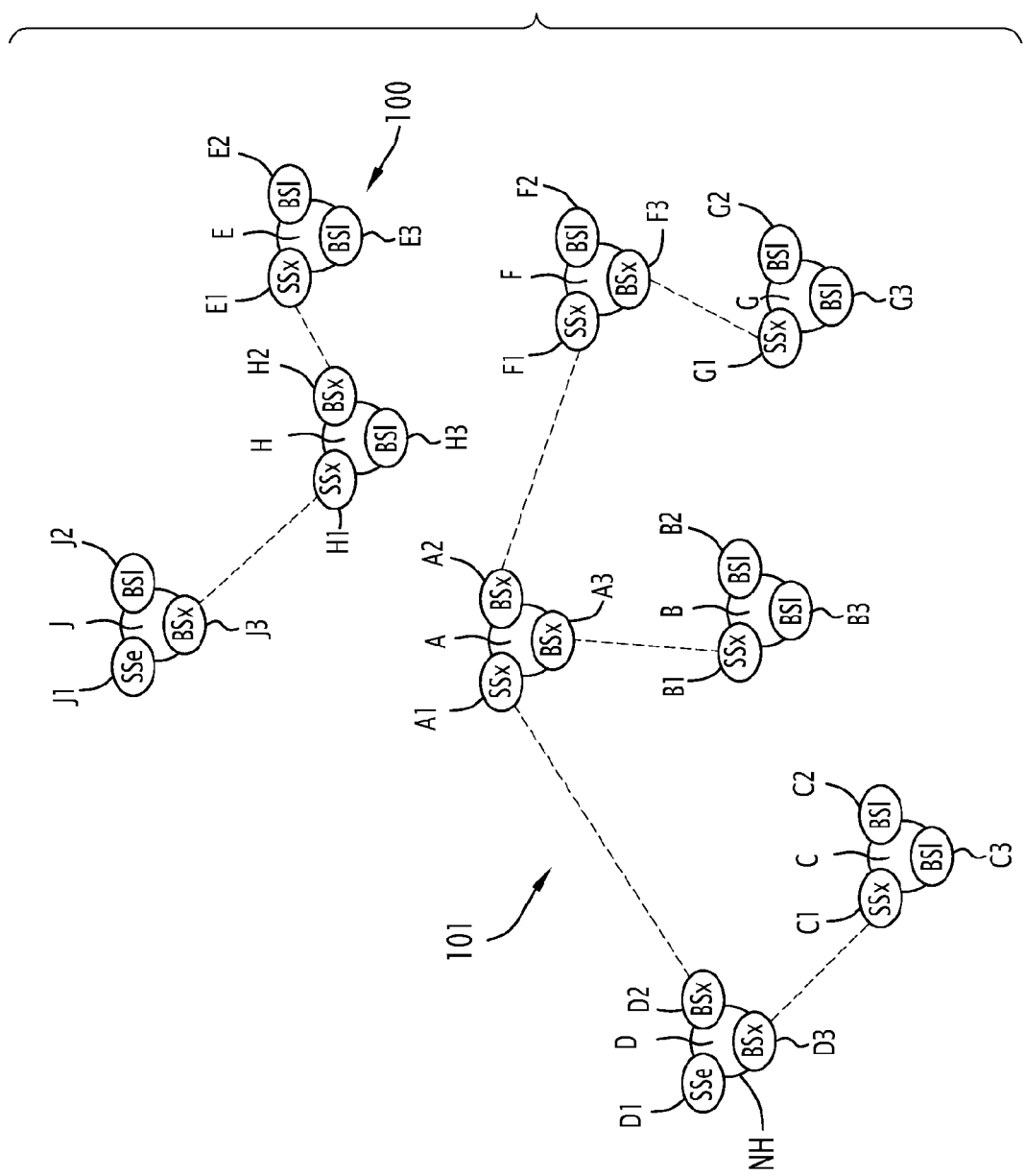
FIG. 8 shows the structure of an ad hoc network in one embodiment of the invention.

Let us now assume that the network corresponding to subgroup 100 comes closer to the network corresponding to sub-group 101, as shown in FIG. 8. These two networks 100, 101 have no possibility of connecting in their current state, since only the non-connected BSs are facing each other.

In order to offset the occurrence of this type of problem during merging attempts between two networks, according to another rule (rule no. 5), when there are no more free SSs in a node, then at least one BS without a connection (if one exists) of the node performs alternating operation between BS and SS (also hereafter called dual cycle) according to a given random time parameterization, as a function of commands from the control unit of the node.

According to the embodiments, a single free BS, or several or all of the free BSs, of the node are switched into dual mode. In particular, it may become necessary to have several dual cycle BSs in a node when FESA sectoral antennas are used, in order to allow connections between the visible nodes.

Thus, in the case corresponding to FIG. 8, all of the non-connected BSs of the nodes go into a BS-SS cycle at a configurable random rhythm. These cycles have, depending on a random drawing, independent durations so as to guarantee catching between the nodes.

Dual mode operation makes it possible to implement new connections between BS and SS.

Thus, the H3 radio module in BS operation of a dual mode and the F2 radio module in SS operation of a dual mode establish a connection.

Figure 9:
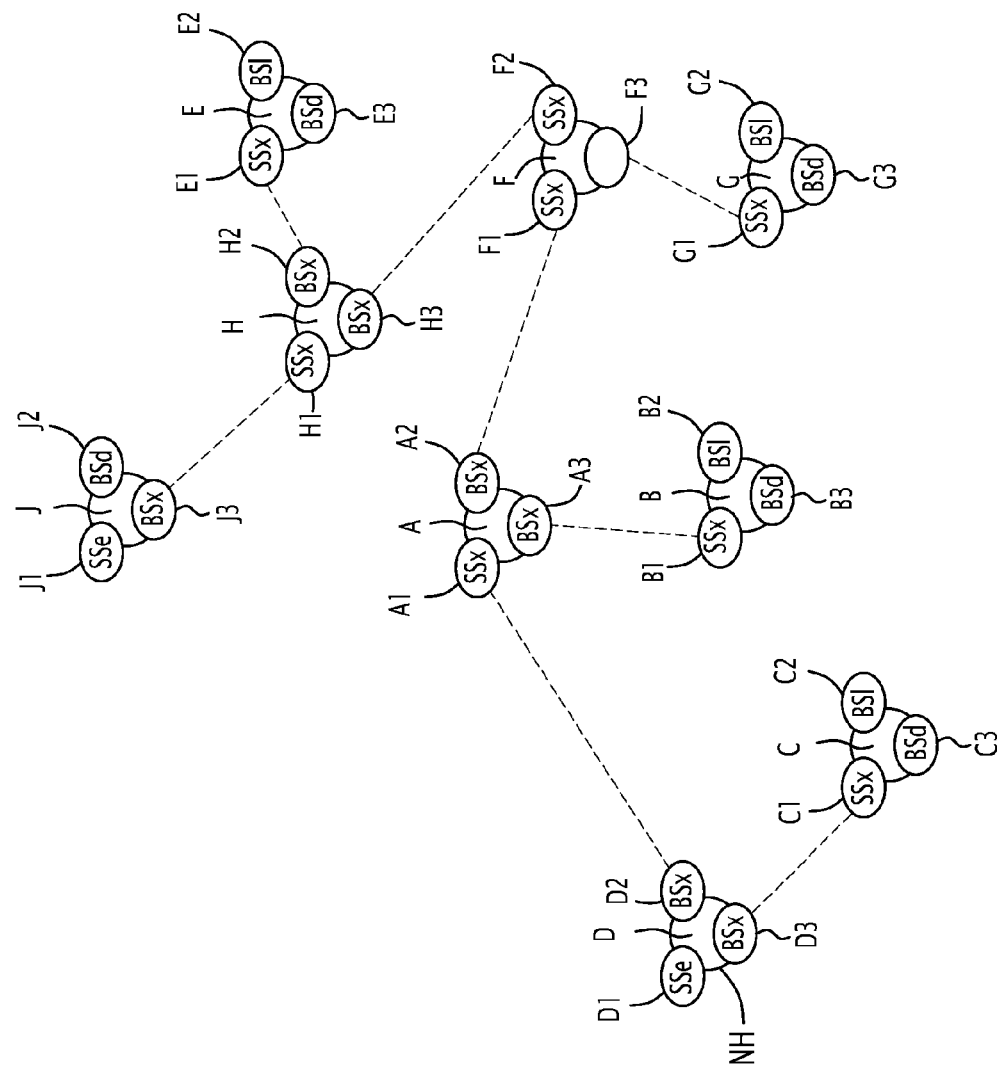
FIG. 9 shows the structure of an ad hoc network in one embodiment of the invention.

The merging phase then leads to the topology indicated in FIG. 9.

In the example illustrated in FIG. 9, two NHs are shown during this merging phase of the two networks 100, 101.

As a reminder, a single NH may, however, exist at a given moment in the network. The merging procedure for two networks will then have to resolve this inconsistency and only retain a single network head.

A BS of a node transmits, to an SS of another node (lower level of the tree structure) to which it is connected, a synchronization pattern so as to temporarily synchronize the frames (by synchronizing the SS on the BS). The synchronization is therefore done by successive connection from a higher level to a lower level. The network head is therefore the origin of the synchronization.

Furthermore, there is a synchronization at a node, so that the DL transmitting frames for the radio modules in BS mode take place at the same time as the UL frames from the SS stations of a same node (see FIG. 3) during a period $T_x$. An SS radio module of a node x does not necessarily need to receive this synchronization, as it can only transmit at specific moments determined by the BS of another node y, to which it is connected. The purpose is therefore to synchronize the transmissions of the BSs of the node x with the transmissions of the SS of the node x, so that they take place while the node is in receiving mode.

In this way, each node is synchronized either in phase or in phase shift with a time reference, depending on whether its rank is even or odd.

The synchronization within a node can be done by GPS, which provides a common time reference. In that case, the control unit of the node on the one hand commands the transition into transmitting mode of the BSs as a function of the common reference received, and on the other hand applies the time shift (0 or 1 half-frame) necessary for synchronization of the transmissions.

Without GPS, an SS must be able to provide a signal symbolizing the type of frame (DL or UL) transmitted by the BS to which it is connected (synchronization by seeping or regeneration). This information can for example be extracted from the preambles of frames transmitted by that BS.

It may also be possible to consider settling for only one signal indicating when the SS is transmitting. Assuming that, irrespective of the quantity of information an SS must transmit, the beginning or end of an SS transmission always occurs at the same time relative to the beginning of the frame, then it is relatively easy to regenerate the synchronization owing to the frequency of that moment and the DL/UL ratio, which is 50%.

If that moment (beginning or end of an SS transmission) is not stable over time, the complexity of the mechanism for regenerating the synchronization risks being extreme.

A simple method, based only on the Tx/Rx signal of an SS, would consist of having the SS use all of the UL frame by sending padding data if necessary, in addition to useful data. To that end, the SS must either always ask for the maximum bandwidth, or the scheduler of the BS must directly allocate all of the sub-frame UL to the SS, which is relatively easy inasmuch as there is only a single connected SS.

In order to ensure synchronization of the nodes in a network without GPS, an alternative is considered below using either rule 6a or rule 6b.

According to rule 6a, at any given moment, a maximum of only one SS may exist in a node.

Figure 10:
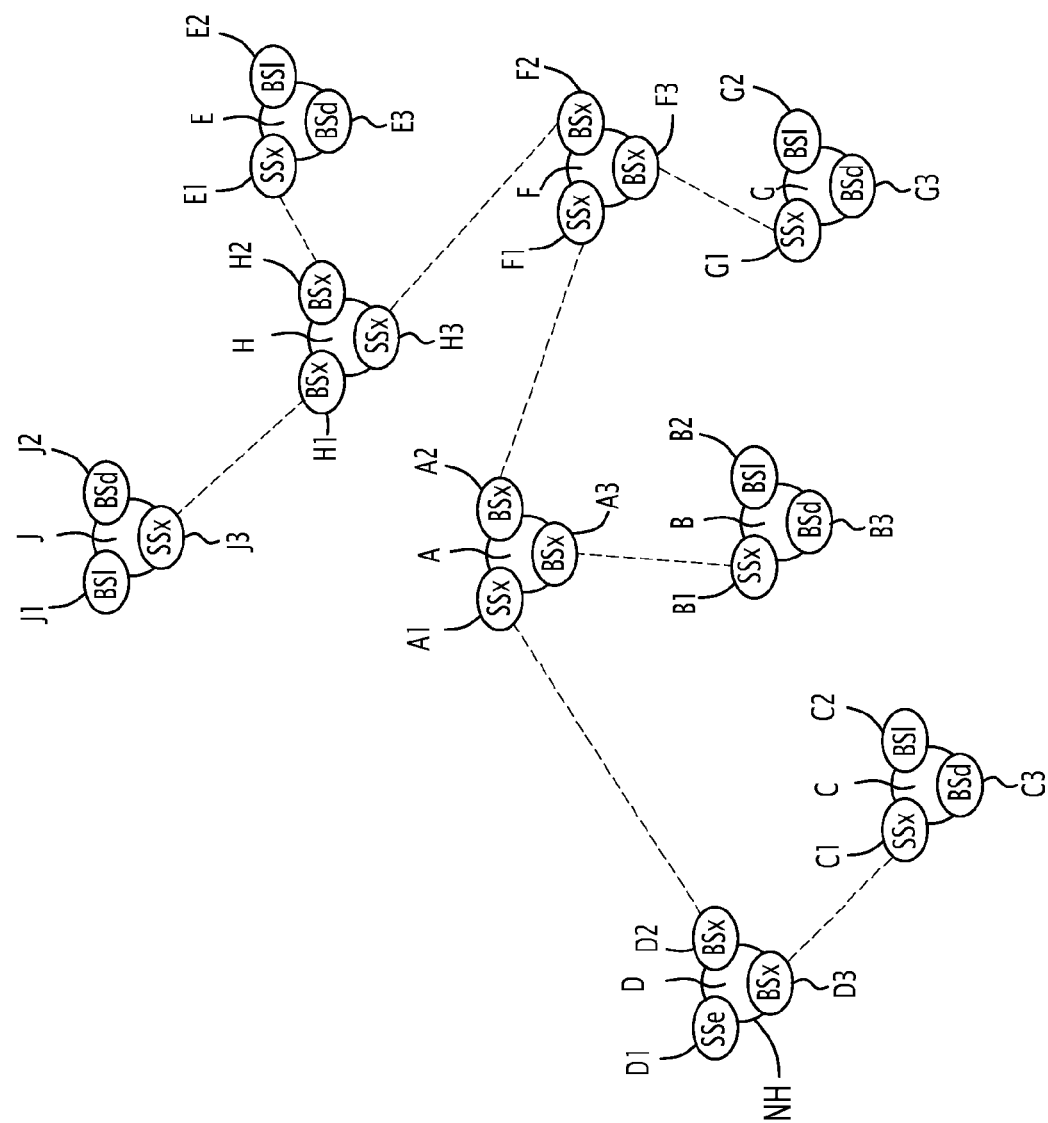
FIG. 10 shows the structure of an ad hoc network in one embodiment of the invention.

If this rule 6a is applied to the configuration of FIG. 9, the control unit of node F cannot accept the new connection between the radio module H3 in the BS role and the radio module F2 in the SS role, since the radio module F1 is already an SS. A direction reversal of the connection must therefore take place. The reversal therefore leads to the BS F2-SS H3 pair, thereby propagating another reversal to nodes H and J, as illustrated in FIG. 10, the radio module H1 becoming BS and the radio module J3 becoming SS.

Furthermore, the radio module J1 goes from the listening SS status to BS. The NH resulting from the merger is therefore the radio module D1. This automatically resolves the problem of the NH, which must be unique after a merger.

According to rule 6b, in a node, it is possible to have, at the same time—for a limited or unlimited duration—, several radio modules in SS mode, on the condition that only one of those SSs is used for the synchronization of the node.

If rule 6b is applied, then the network can remain in the same configuration as in FIG. 9.

All of the examples considered below apply rule 6a.

Furthermore, during the merging of two sub-networks, we will consider two cases, during the application of rule 6a (one single SS, connected or able to be connected, per node):
one without optimization of the topology,
the other with optimization of the topology.

The case of merging without optimization of the topology consists of simply applying a first discovered node principle: it is considered that the first node that discovers the other performs the topology reversal procedure.

In this way, a radio module of a node x of a network operating in dual cycle, which has detected, during its listening in SS mode, a BS radio module of a node y not belonging to that network, remains in SS mode and continues the association and synchronization procedure with that detected BS, while the control unit of the node x commands the transition into BS of the radio module of the node x, which was in SS until then.

If a BS of a remote node was connected to that radio module of the node x, in SS mode until then, during the transition of the latter into BS, the connection is broken. The BS radio module of the remote node must then perform a dual cycle once that connection is broken, and it will discover in SS mode, during its dual cycle, the BS of the radio module of the node x. Under the control of the control unit of the remote node, the radio module will therefore leave the dual cycle to go into SS mode and connect with the BS of the node x (reversed connection), while the mode reversal continues in the remote node, the radio module in SS mode until then going into BS mode, etc. The topology reversal is propagated gradually.

Figure 11:
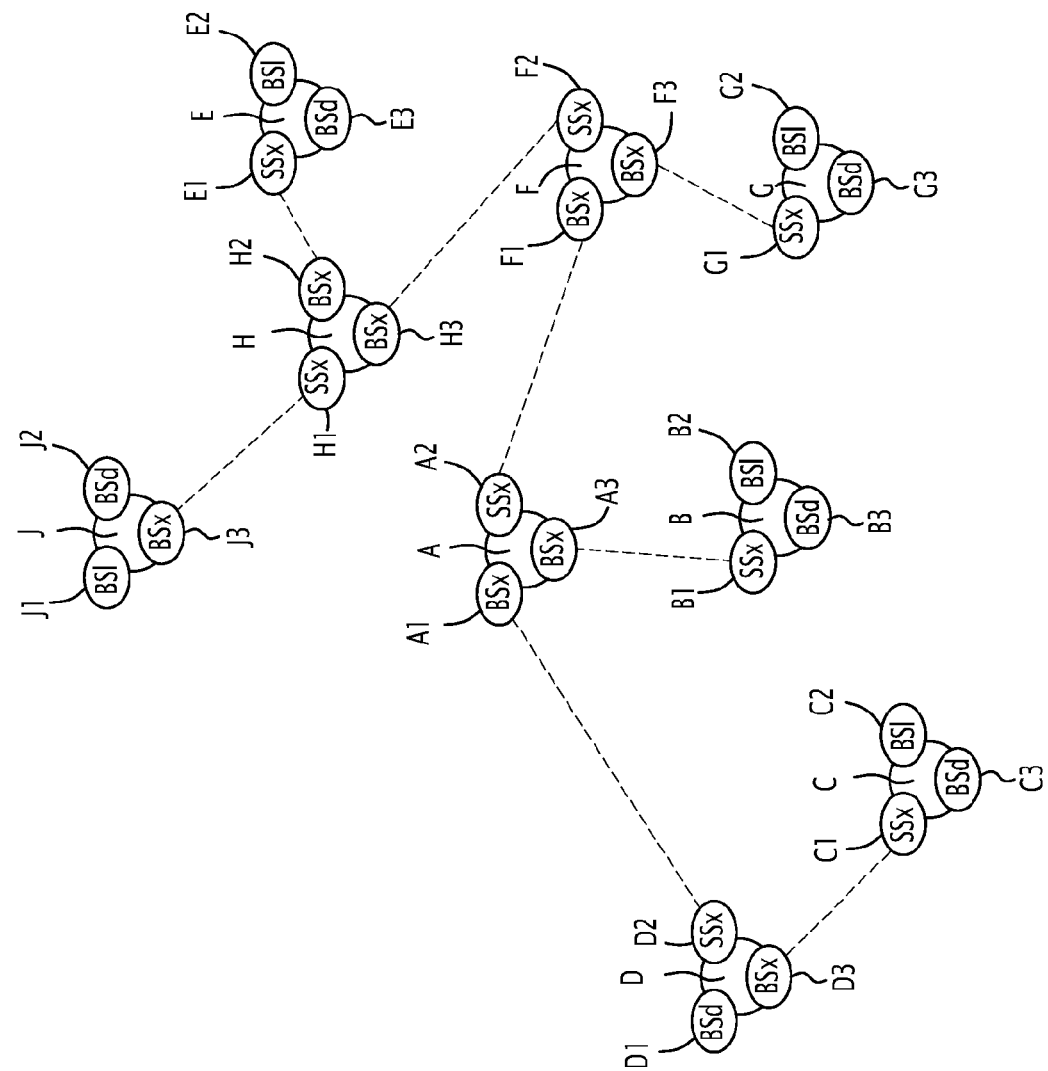
FIG. 11 shows the structure of an ad hoc network in one embodiment of the invention.

FIG. 11 shows the finalization of the merging of the preceding example without topology optimization according to the configuration shown in FIG. 8, followed by the first merging stage shown in FIG. 9, in the case where the radio module F2 of the node F that detected, in its dual cycle, in SS mode, the radio H3 of node H first (and not radio module H3 of node H, which detected, in its dual cycle, in SS mode, the radio F2 of node F first).

In this example, the reversal has been done as far as the NH (node D). The latter being responsible for the synchronization of the network, in a first embodiment, one avoids reversing the SS/BS modes of the radio modules for the latter.

In the case of merging with optimization of the topology mentioned above, each free BS of a network transmits the size thereof, for example in the frame preamble (this size can be indicated in various ways, for example by indicating the total number of nodes in the network).

In this case, a dual cycle radio module of a node x, which then detects, during its SS mode, a node y belonging to a smaller network, ignores the latter, under the control of the control unit. During the BS mode of the dual cycle of this radio module of the node x, it detects the radio module in SS mode in dual cycle of the smaller network, which then initiates the topology reversal in its network (it will be noted that the solution is always valid with omnidirectional antennas, but cannot always be used in the case of directional antennas).

Thus, using this method, it is always the smaller of the networks that attaches to the larger.

One alternative consists of broadcasting not the size of the network, but its importance (in the event a hierarchy must be respected between networks), and the less important network then merges with the more important network.

In one embodiment, it is the hierarchical level of the dual cycle BS in the tree structure of the network that will condition the network in which the topology reversal will take place, which may or may not be combined with the preceding size or importance criteria.

FIG. 10 corresponds to one example of finalization of the merging with network optimization, according to the approach configuration illustrated in FIG. 8.

The network 101 being larger, it is the dual cycle radio module H3 of node H that detects during its SS mode (the control unit then refusing to establish a connection between the dual cycle radio module H3 in BS mode and the dual cycle radio module in SS mode). The connection between H3 in SS and F2 in BS will therefore be established. The topology reversal to respect a single SS per node is then implemented in the portion that corresponded to the network 100, with the transition into dual cycle of H1 and J3, and after establishing the connection between SS J3 and BS H1, the transition into BS mode of B1.

Rule 6a naturally prevents any relooping between nodes B and G.

Principle 6b does not prevent it, which requires it to dictate non-relooping constraints.

In the latter case, several principles may be considered to avoid relooping.

If the NH has a global knowledge of the network and makes choices between routes, then it may prohibit any link between nodes B and G. However, as long as these two nodes remain in range, the NH may keep this link in reserve as a possible link in order to more quickly offset link breaks.

The late entry of a node into an already-formed network is in fact the most frequently encountered case. In fact, all of the nodes are never activated at the same time.

The problem primarily consists of determining the different possible cases of anchoring of a node relative to a structure already in place.

Two alternatives are proposed to resolve this problem, according to rules 7a and 7b.

According to rule 7a, in all circumstances, one keeps, per formed network node, a radio module in BS-SS dual cycle, i.e. not connected, respectively for the transmission of preambles and listening, so as to be able to connect sub-groups or isolated nodes.

Figure 12:
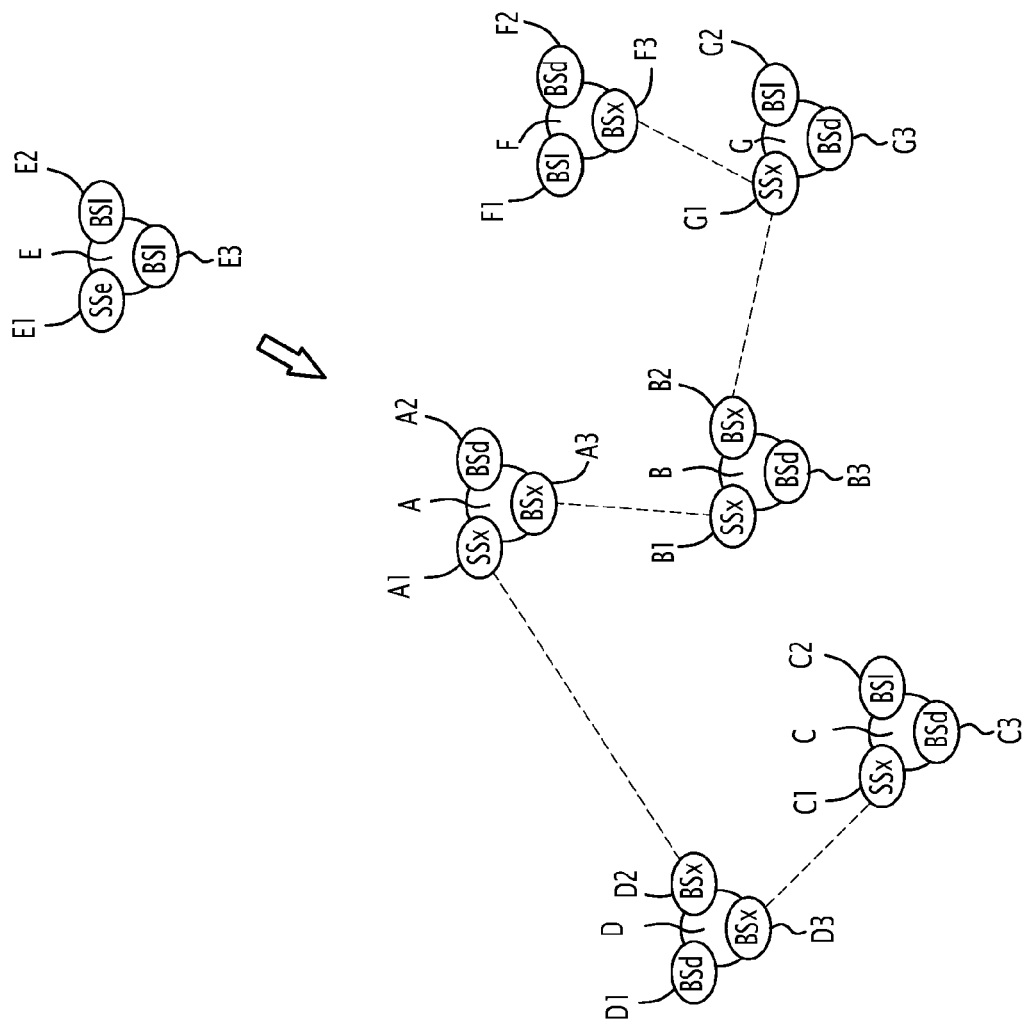
FIG. 12 shows the structure of an ad hoc network in one embodiment of the invention.

During the SS phase of the dual cycle of the radio module, it may connect to one of the two BSs of the isolated station in the network. It is also possible for the isolated station to connect with its SS to the network during the BS phase of the dual cycle radio module. FIG. 12 shows this first option with a dual cycle radio module for each node of the formed network.

In this solution, the links between the nodes must be established so as always to keep one of the radios not connected in BS-SS dual cycle. Thus, if the isolated node E connects to node F by connection between a BS E2 or E3 and the radio module F2 of node F when F2 is in SS phase of its dual cycle, then the radio F1 of node F will in turn have to go to BS/SS dual mode.

Figure 13:
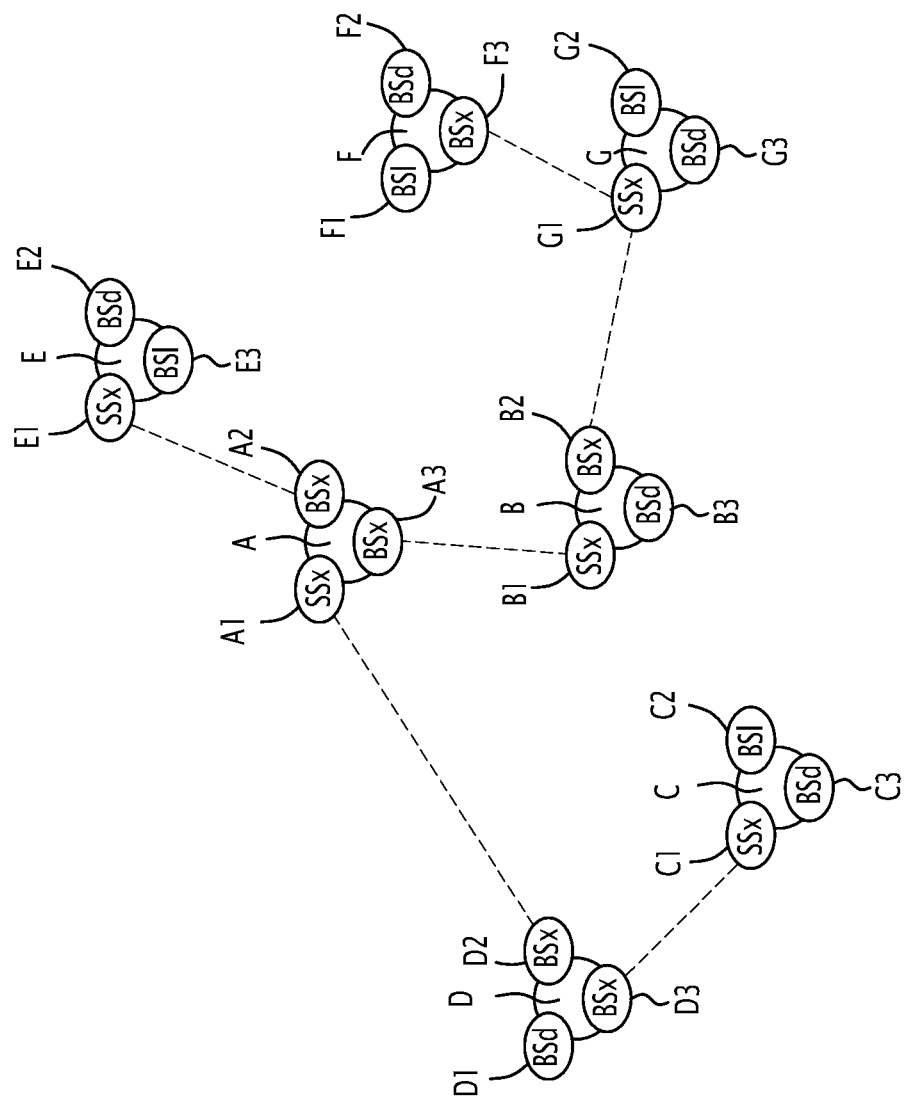
FIG. 13 shows the structure of an ad hoc network in one embodiment of the invention.

The following operation is then possible depending on the detected radio modules:

If one of BS E2 or E3 of node E hears the SS phase of the radio module A2 of node A and:
  if rule 6b is applied, then node A will have two SSs (A1 and A1) and no reversal will be done in the network;
  if rule 6a is applied, then the control unit of node A must send a message to node E asking if the SS of the latter is free. If it is, SS E1 of node E must connect to radio module A2 of node A as shown in FIG. 13, on the condition that the antennas of A2 and E1 allow them to see each other.

According to rule 7a, a radio module in BS-SS dual cycle is always kept with an SS mode not connected to a BS so as to be able to connect sub-groups or isolated nodes, under the command of the control unit. Permanent scanning is thus guaranteed, so as to indicate what BSs are in range to the free SS radios of a node.

Pursuant to principle 7b, a second solution consists of constantly keeping one of the radios of the node in pure SS (at a low cost, for example), for example coupled to a dedicated omnidirectional antenna making it possible to continuously listen for any presence of BSs. This station will never be connected to a BS. Each node of the network is therefore made up of N−1 radios that can operate in BS mode or SS mode and an SS radio (inexpensive, for example) as shown in FIG. 14, where each node X has three radios X1, X2, X3 capable of operating in BS mode or SS mode and a fourth radio X4 operating in SS, with X equal to A, B, C, D, E, F, G.

Pursuant to principle 7b, it is no longer necessary to have radio modules in BS/SS dual mode, even in the event sectoral antennas are used, since a radio module (X4) is always in listening mode with an omnidirectional antenna.

The SS in pure listening mode (X4) must not listen to the preambles of the N−1 other radios of the node (local radios). This is done using a procedure integrated into the control unit.

Figure 14:
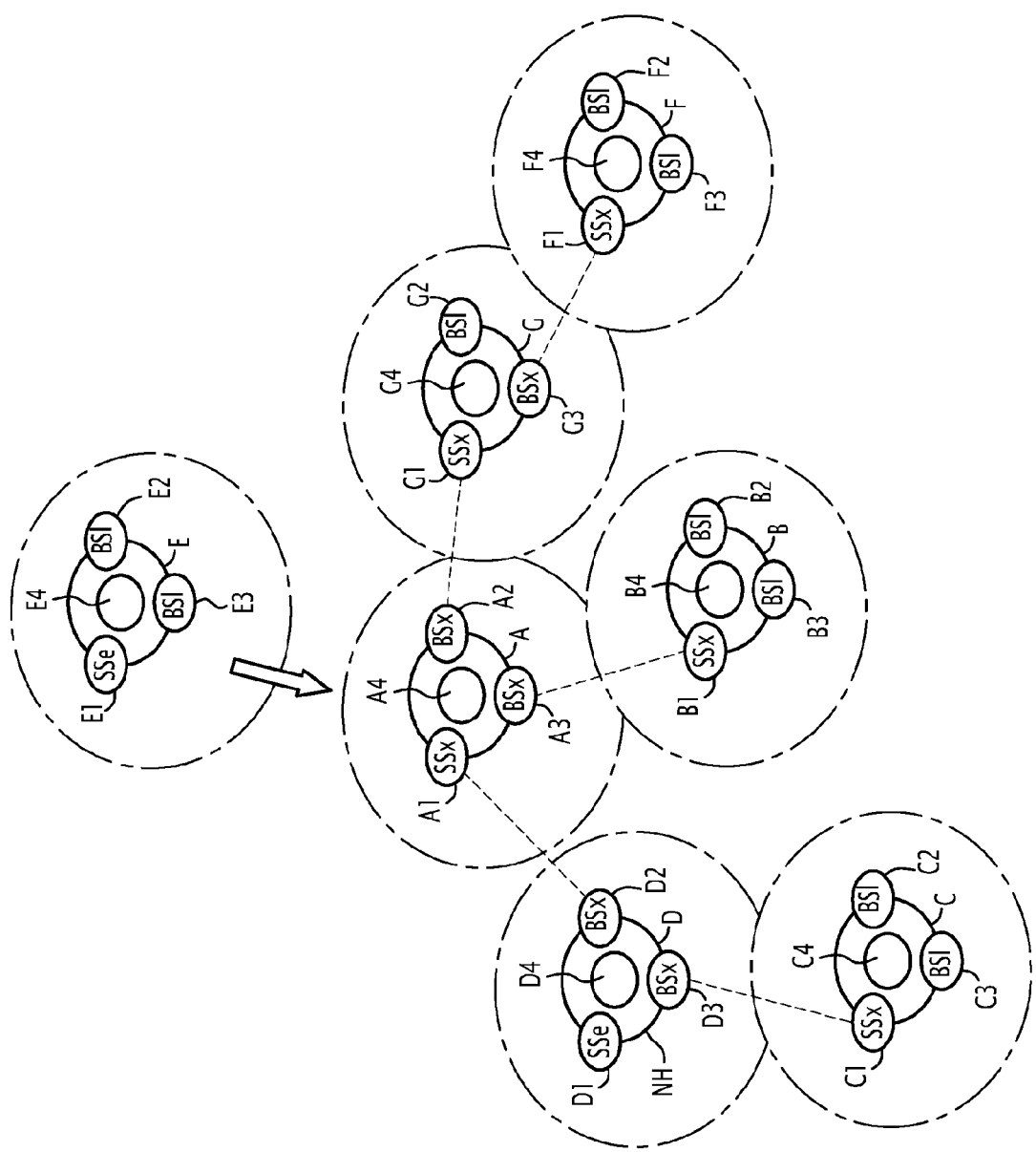
FIG. 14 shows the structure of an ad hoc network in one embodiment of the invention.
Figure 15:
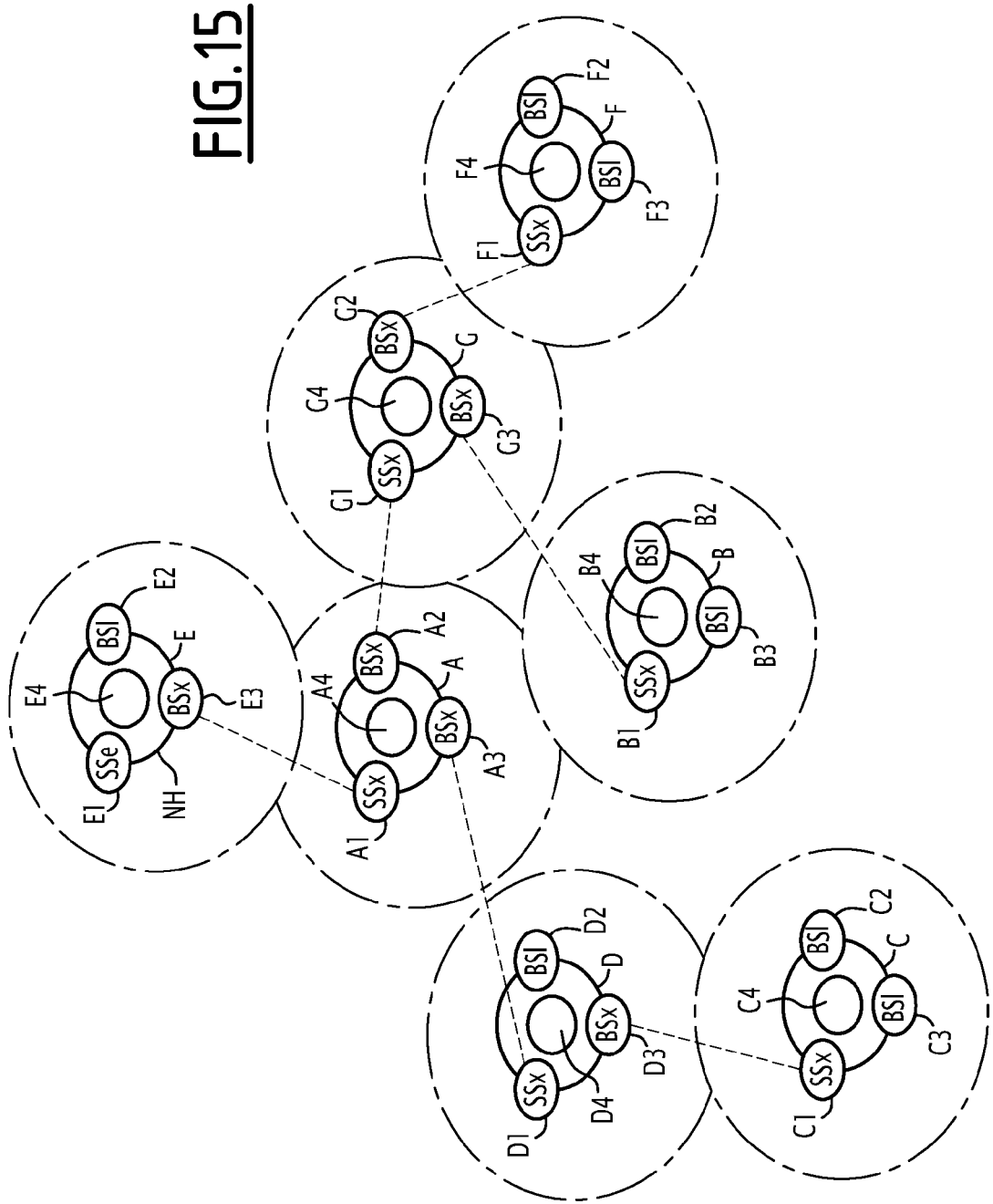
FIG. 15 shows the structure of an ad hoc network in one embodiment of the invention.

When an orphan node enters the network as considered in FIG. 14, two distinct cases may arise:
  1) The purely listening radio module A4 of node A detects BS E3 of node E. If no other rule is established, node A will have to connect its SS A1 to BS3 of node E. All of the radio modules of node A already being connected, changes will have to be made in the network. FIG. 15 gives the configuration of the network after integration of the orphan node E. It should be noted that this network is only possible if nodes B and G are within radio range. Furthermore, node E becomes the NH.
  2) The SS4 of node E detects the BS A2 of node A. If no other rule is established, node E will have to connect its SS E1 to BS A2 of node A. All of the radio modules of node A being connected, changes will have to be made in the network. The resulting configuration will be different from that illustrated in FIG. 15.

The choice of the frequency channel allocated to each BS (and therefore used for the connection between the BS and an SS) can be done in various ways.

In one embodiment corresponding to a preprogrammed choice of channels, the frequency channels of the BSs are fixed, before any deployment, by programming. The channels of the BSs of a same node are chosen in any manner whatsoever in the spectrum. However, a spectral separation, while not strictly necessary, is recommended. For example, if the band makes it possible to implement 45 channels, then, in the case of three BSs in a node, channels 1, 15, 30 or 2, 16, 31, ... will be chosen, and so forth for each of the nodes. This makes it possible to deploy 15 nodes at 3 BSs per node on a same site. With 2 BS per node, 22 nodes are obtained. This is only one example.

The SS does not choose channels, since it must scan all of the possible channels so as to potentially connect to a BS.

In another embodiment corresponding to a choice of the frequency channels as a function of the topology, the NH node is considered to be level 0 (the highest level of the tree).

The level 1 station(s) connect(s) to the NH through its (their) SS. The frequency thereof is therefore set by the BS of the NH.

The level 2 station(s) connect(s) to the level 1 stations through its (their) SS. The frequency thereof is therefore set by the level 1 BSs following a predetermined order.

The cascade of channel values is therefore deduced starting from the root of the network.

During the merging of sub-networks, this is revised globally in the resulting network.

In another embodiment corresponding to a random choice of the frequency channels, the frequencies of the BSs of a node not having any connection (NH node) are chosen randomly among the available channels with a gap between the BS frequencies of at least i channels.

To allow high-bandwidth communications on the molecular network, advanced resource allocation techniques are necessary in order to best optimize the use of the spectral resource (spectral reuse), in particular using the S-TDMA technique (reuse of transmission channels at various locations of the network with controlled mutual interference between the communications conducted in parallel). In short, it is possible to consider that the proposed S-TDMA technique makes it possible to implement, at the same time as the WiMAX frame, on a same frequency, exchanges between distinct pairs of nodes.

In practice, the allocation algorithm that is used takes place at the MAC (Medium Access Control) protocol level. It takes into account the relative positions of the nodes and their communications needs (types of communications, recipients, necessary throughputs, volumes, etc.) to determine the allocations and therefore the parameterization of the communication nodes for each slot of the TDMA frame.

Furthermore, the nodes being able to be in motion, the resource allocation must be dynamic enough to guarantee a maximum allowable interference level between the different communications. This interference level must be estimated continuously through the A-DFS (Advanced-Dynamic Frequency Selection) function.

A routing protocol making it possible to route the data taking into account the creations/updates/destructions of routes with global distribution is necessary to avoid using obsolete routes during topology changes, for example due to the breaking of certain links.

Data received by a radio module of a node, whether SS or BS, is transmitted locally to another radio module, SS or BS, of the node under the control of the control unit, as a function of the final destination of the data and the routing table stored at the node. This other radio module then relays this data by transmitting it in turn toward a radio module (of another node) to which it is connected, as a function of the final destination of the data and the routing tables stored in the node.

The routing tables can be centralized at the NH and/or local at each node.

In the case of routing tables present only at the NH, each node wishing to communicate with a destination must ask the NH for the route to be used. This therefore causes a delay in establishing communications, which is detrimental.

In one embodiment, there are therefore local routing tables (i.e. stored in all of the nodes) thereby making it possible to relay the information without making a request to the NH. Two approaches are traditionally used:
  a "Link State" approach, for which each node has global knowledge of the topology of the network,
  a "Distance Vector Approach," for which each node i maintains, for each destination x, the number of hops necessary ($d_{ij}(x)$) to reach the destination x by passing through each of its neighbors j. The packets are then sent by the shortest path. Each node must then broadcast the calculated distances to reach each destination to all of its neighbors.

Below, we consider the first case, for which each node of the network locally has global knowledge of the topology of the network. The NH is responsible for calculating the routing table and must distribute that table to all of the nodes of the network (for example in a data packet just after sending the beacon, also called preamble) using relays between the nodes of the network. In this way, a node needing to relay a packet in the network need only read in its local routing table. As in all ad hoc routing protocols, the routing table calculated by the NH is updated regularly. In order for the NH to calculate the different possible routes, each node must regularly escalate its potential neighbors at one hop to the NH, as well as the established connections (in fact, certain connections may be prohibited, even if the nodes are in radio visibility).

In one embodiment:
  each node must escalate its neighbors at one hop and its BS-SS connections to the NH; and/or
  any node of the network that detects a loss of connection must inform the NH thereof by sending a message to update the routing table; and the NH must promptly distribute that link loss on the network and make the connection prohibitions between the nodes in range if it is aware of any. The establishment of the new network after the link break is then done in the same way as during grouping together of two sub-networks.

The invention has been described above considering that the control unit in each node is a distinct entity from the radio modules. Nevertheless, the invention can be implemented with a control unit at least part of which is distributed in one or more radio modules of the node.

What is claimed is:

1. A transceiver station for forming a telecommunications network node, the station comprising:
  at least two transceiver radio modules and a control module;
  each transceiver module operating alternatingly as a subscriber station to establish a connection with a base station of a first other node and as a base station to establish a connection with a subscriber station of a second other node, as a function of commands from the control module,
  the control module determining or receiving at least one modification of a state of the network and dynamically controlling at least one change in the operation of at least one transceiver module, from subscriber station to base station or vice versa, as a function of at least the determined modification, the number of subscriber stations connected to a base station being at most equal to 1.

2. The transceiver station according to claim 1, wherein, when the node no longer has any subscriber station that is not connected, the control module controls alternating operation as base station and subscriber station of at least one non-connected transceiver of the node.

3. The transceiver station according to claim 2, wherein the operation alternates as a function of a random time parameter.

4. The transceiver station according to claim 2, wherein the station making up a node of a first network:

a non-connected base station of the node is adapted to insert a parameter indicating a degree of importance of the first network in a frame transmitted by said base station; and/or when, during alternating operation of a transceiver module of the node, said transceiver module then operating as a subscriber station detects a frame from a non-connected base station of another node of a second network separate from the first network, said frame indicating a degree of importance of the second network, the control module of the node of the first network:

prohibits the connection between the transceiver module operating as subscriber station of said node and said base station of the other node if the degree of importance of the second network is lower than a degree of importance of first network; and authorizes the connection between the transceiver module of the node operating as subscriber station and said base station of the other node if the degree of importance of the second network is higher than the degree of importance of the first network.

5. The transceiver station according to claim 2, wherein, when, during alternating operation of a transceiver module of the node, a connection deemed high-priority is established between a base station of another node and said transceiver module then operating as subscriber station, and the number of subscriber stations connected in the node is greater than or equal to 2, the control module commands said transceiver module to leave the alternating operation and keeps said transceiver module a subscriber station while the control module commands the other connected transceiver modules of the node then operating as subscriber stations to transition to base station.

6. The transceiver station according to claim 1, connected to a network and further comprising a given transceiver module that is adapted to operate only as a non-connected subscriber station, when the given transceiver module detects a non-connected base station of a node not connected to the network, then the control module commands that a subscriber station of the transceiver station connect to said base station.

7. The transceiver station according to claim 1, wherein:

said base station of the node is adapted to indicates a status, connected or not connected, in a frame that the base station transmits; and the control module refuses a connection of the subscriber station of the node with a base station of another node having transmitted a preamble indicating a connected status; and/or the control module refuses any connection of said base station of the node with a subscriber station of another node when said base station of the node is already connected.

8. The transceiver station according to claim 1, wherein the control module prohibits the connection between the node and another node, when there is already a connection between said node and said other node.

9. The transceiver station according to claim 1, wherein a subscriber station of the node provides a synchronization signal to a base station of the node, said synchronization signal depending on a signal received by said subscriber station and transmitted by the base station of another node that is connected to the subscriber station.

10. The transceiver station according to claim 1, further comprising several subscriber stations, and in which only one of said subscriber stations of the node provides a synchronization signal to each base station of the node.

11. The transceiver station according to claim 1, wherein a synchronization signal depending on a signal from GPS is provided to all of the base stations of the transceiver station.

12. The transceiver station according to claim 1, wherein the control module commands the subscriber station of the node seeking to connect to a base station not to listen to a preamble transmitted by a base station of the node.

13. A communication method in a telecommunications network comprising transceiver stations forming network nodes, a transceiver station comprising a control module and at least two transceiver radio modules each operating alternatingly as subscriber station to establish a connection with a base station of a first other node, and as a base station to establish a connection with a subscriber station of a second other node, as a function of commands from the control module, according to which, each transceiver station performs the steps of:

determining at least one modification of the status of the network, and commanding dynamically at least one operating change of at least one transceiver module, from subscriber station to base station or vice versa, as a function of at least the determined modification;

the number of subscriber stations connected to a base station must be at most equal to 1.

14. The communication method according to claim 13, wherein, when said transceiver station no longer comprises any non-connected subscriber stations, the control module of the transceiver station is adapted to command an alternating operation as base station and subscriber station of at least one non-connected transceiver of the transceiver station.

* * * * *